(12) United States Patent
Ramot et al.

(10) Patent No.: US 12,496,433 B2
(45) Date of Patent: Dec. 16, 2025

(54) CATHETER FIXATION DEVICE

(71) Applicant: Ramot Biomedical Engineering Ltd., Maas (IL)

(72) Inventors: Yair Ramot, Maas (IL); Ronny Barak, Tel Aviv (IL)

(73) Assignee: Ramot Biomedical Engineering Ltd., Hashlosha Street (IL)

( * ) Notice: Subject to any disclaimer, the term of this patent is extended or adjusted under 35 U.S.C. 154(b) by 753 days.

(21) Appl. No.: 17/762,450

(22) PCT Filed: Oct. 1, 2020

(86) PCT No.: PCT/IB2020/059193
§ 371 (c)(1),
(2) Date: Mar. 22, 2022

(87) PCT Pub. No.: WO2021/064623
PCT Pub. Date: Apr. 8, 2021

(65) Prior Publication Data
US 2022/0395670 A1    Dec. 15, 2022

Related U.S. Application Data

(60) Provisional application No. 62/909,806, filed on Oct. 3, 2019.

(51) Int. Cl.
*A61M 25/02* (2006.01)
*A61M 25/01* (2006.01)
(Continued)

(52) U.S. Cl.
CPC .......... *A61M 25/02* (2013.01); *A61M 5/1418* (2013.01); *A61M 25/01* (2013.01);
(Continued)

(58) Field of Classification Search
CPC .......... A61M 25/02; A61M 2025/0246; A61M 2025/0266; A61M 2025/028;
(Continued)

(56) References Cited

U.S. PATENT DOCUMENTS 3,561,445 A * 2/1971 Katerndahl ........ A61M 25/0113
604/159
3,870,043 A * 3/1975 Dunn .................... A61M 5/158
604/272
(Continued)

FOREIGN PATENT DOCUMENTS

EP         2070561        6/2009

OTHER PUBLICATIONS

PCT Search Report and Written Opinion PCT/IB2020/059193, Mar. 9, 2021.

*Primary Examiner* — William R Carpenter
*Assistant Examiner* — Robert F Allen
(74) *Attorney, Agent, or Firm* — Dekel Patent Ltd.; David Klein

(57) ABSTRACT

A catheter fixation device (10) includes a body (12), a catheter (16) having a proximal portion (18) and a distal portion that passes through an opening (14) in the body (12), and an anti-pull-out lock mechanism comprising an arcuate channel (24) bounded by a pair of arcuate walls (25, 26) extending from a floor of the body (12). A coiled portion (22) of the catheter (16) is constrained to move between the arcuate walls (25, 26) during movement of the proximal portion (18) and the distal portion remains substantially in place.

10 Claims, 3 Drawing Sheets

(51) Int. Cl.
*A61M 5/14* (2006.01)
*B65H 75/00* (2006.01)
*B65H 75/02* (2006.01)

(52) U.S. Cl.
CPC . *A61M 25/0113* (2013.01); *A61M 2025/0206* (2013.01); *A61M 2025/024* (2013.01); *A61M 2025/0246* (2013.01); *A61M 2025/0253* (2013.01); *A61M 2025/0266* (2013.01); *A61M 2025/028* (2013.01); *A61M 2025/0286* (2013.01); *B65H 75/00* (2013.01); *B65H 75/02* (2013.01)

(58) Field of Classification Search
CPC ............ A61M 5/1418; A61M 25/0113; A61M 2025/0206; A61M 2025/0253; A61M 2025/0286; A61M 25/01; A61M 2025/024; B65H 75/02; A61N 1/0558; A61N 1/0539; A61J 15/0061
See application file for complete search history.

(56) References Cited

U.S. PATENT DOCUMENTS

| | | | | |
|---|---|---|---|---|
| 3,942,528 A * | 3/1976 | Loeser | A61M 39/04 | 604/86 |
| 3,995,628 A * | 12/1976 | Gula | A61M 25/065 | 604/159 |
| 4,029,103 A * | 6/1977 | McConnell | A61M 25/02 | 604/179 |
| 4,083,621 A * | 4/1978 | Davidson | H02G 11/02 | 439/501 |
| 4,160,451 A * | 7/1979 | Chittenden | A61M 25/0113 | 242/405 |
| 4,397,641 A * | 8/1983 | Jacobs | A61M 25/02 | D24/128 |
| 4,467,979 A * | 8/1984 | Koehler | B65H 75/4471 | 242/402 |
| 4,656,320 A * | 4/1987 | Maddock | H02G 11/02 | 242/405.3 |
| 4,659,329 A * | 4/1987 | Annis | A61M 25/02 | 604/327 |
| 4,913,369 A * | 4/1990 | Lia | G02B 23/2476 | 242/129 |
| 5,078,703 A * | 1/1992 | Bryant | A61M 25/0014 | 604/533 |
| 5,147,320 A * | 9/1992 | Reynolds | A61M 25/02 | 604/174 |
| 5,265,822 A * | 11/1993 | Shober, Jr. | B65H 75/2281 | 242/388.2 |
| D352,449 S * | 11/1994 | Rosine | | D8/359 |
| 5,810,835 A * | 9/1998 | Ryan | A61M 25/0084 | 606/108 |
| 5,916,199 A * | 6/1999 | Miles | A61M 25/02 | 604/174 |
| 6,001,081 A * | 12/1999 | Collen | A61M 25/02 | 604/174 |
| 6,065,708 A * | 5/2000 | Matsubara | H02G 11/02 | 242/612 |
| 6,273,873 B1 * | 8/2001 | Fleischer | A61M 25/02 | 604/177 |
| 7,198,066 B2 * | 4/2007 | Kagenow | A61M 25/02 | 604/177 |
| 7,407,128 B1 * | 8/2008 | Chang | B65H 75/4431 | 242/385.4 |
| 7,571,744 B2 * | 8/2009 | Zia | A61M 1/0222 | 604/179 |
| 7,594,909 B2 * | 9/2009 | Mogensen | A61M 39/08 | 604/174 |
| 7,766,162 B2 * | 8/2010 | Maki | A61M 25/002 | 600/585 |
| 9,492,640 B2 * | 11/2016 | Rosenhan | A61M 25/02 | |
| 9,821,144 B2 * | 11/2017 | Mouri | A61M 25/01 | |
| 10,215,313 B2 * | 2/2019 | Łańko | F16L 11/10 | |
| 10,221,037 B1 * | 3/2019 | Blasbalg | B65D 25/2802 | |
| 10,307,565 B2 * | 6/2019 | Sakaguchi | A61B 50/00 | |
| 11,554,254 B2 * | 1/2023 | Pennell, II | A61M 25/02 | |
| 2002/0130059 A1 * | 9/2002 | Armijo | A61M 25/002 | 206/438 |
| 2006/0047268 A1 * | 3/2006 | Stephens | A61M 25/0041 | 604/533 |
| 2007/0029431 A1 * | 2/2007 | Lai | B65H 75/2227 | 242/395 |
| 2007/0208300 A1 * | 9/2007 | Pravong | F16L 11/15 | 604/525 |
| 2008/0017745 A1 * | 1/2008 | Laga | B65H 75/406 | 242/395 |
| 2008/0243082 A1 | 10/2008 | Goodman | | |
| 2009/0157157 A1 * | 6/2009 | Schorn | A61M 25/02 | 604/178 |
| 2013/0178836 A1 * | 7/2013 | Teutsch | B65H 75/4434 | 604/533 |
| 2015/0133891 A1 | 5/2015 | Rosenhan | | |
| 2015/0250984 A1 * | 9/2015 | Humphries | A61M 5/1418 | 29/428 |
| 2017/0326340 A1 * | 11/2017 | Howell | A61F 13/01034 | |
| 2019/0160262 A1 * | 5/2019 | Jones | A61M 25/02 | |
| 2019/0292006 A1 * | 9/2019 | Alford | B65H 75/4449 | |
| 2020/0353214 A1 * | 11/2020 | Yasunaga | A61M 25/09041 | |

* cited by examiner

CATHETER FIXATION DEVICE

FIELD OF THE INVENTION

The present invention relates generally to devices for supporting and fixing a catheter extending from an opening in a subject, for example a supply catheter or a drain catheter.

BACKGROUND OF THE INVENTION

Many medical procedures conducted on a patient require the patient to be provided with a catheter, tube, line and the like (the terms being used interchangeably throughout the disclosure and claims) The catheter typically is introduced through an incision in the skin of the patient (or other opening, including a natural orifice). Such catheters are typically used to deliver fluids to the patient or to remove fluids from the patient.

In the prior art, catheters are secured to the patient after insertion and placement, such as by means of sutures, for example, as part of or in addition to the procedure for closing the incision. Alternatively, or in addition thereto, the drain line is secured to the skin using adhesive tape or surgical staples. However, clinical follow up on catheter placement and fixation reports a high rate of complications including leakage, obstruction, dislodgement, migration, malposition, and infection.

Thus an improved catheter fixation device is clearly needed.

SUMMARY OF THE INVENTION

The present invention seeks to provide an improved catheter fixation device, as is described more in detail hereinbelow. The catheter fixation device of the invention fits virtually all known catheter diameters and materials. The catheter fixation device structure includes, without limitation, an anti-pull-out lock mechanism and enables controllable catheter maneuverability. The catheter fixation device further includes, without limitation, an anti-kink guard mechanism that ensures catheter integrity and functionality.

The catheter fixation device further includes, without limitation, a safety relief mechanism. The device may be attached to the skin of the patient with an adhesive pad, which is simple to apply and assemble. The device may have a cover that enables easy monitoring, cleaning and maintenance of the device.

There is thus provided in accordance with an embodiment of the present invention a catheter fixation device that includes a body, a catheter having a proximal portion and a distal portion that passes through an opening in the body, and an anti-pull-out lock mechanism comprising an arcuate channel bounded by a pair of arcuate walls extending from a floor of the body, and wherein a coiled portion of the catheter is constrained to move between the arcuate walls during movement of the proximal portion and the distal portion remains substantially in place.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1A:
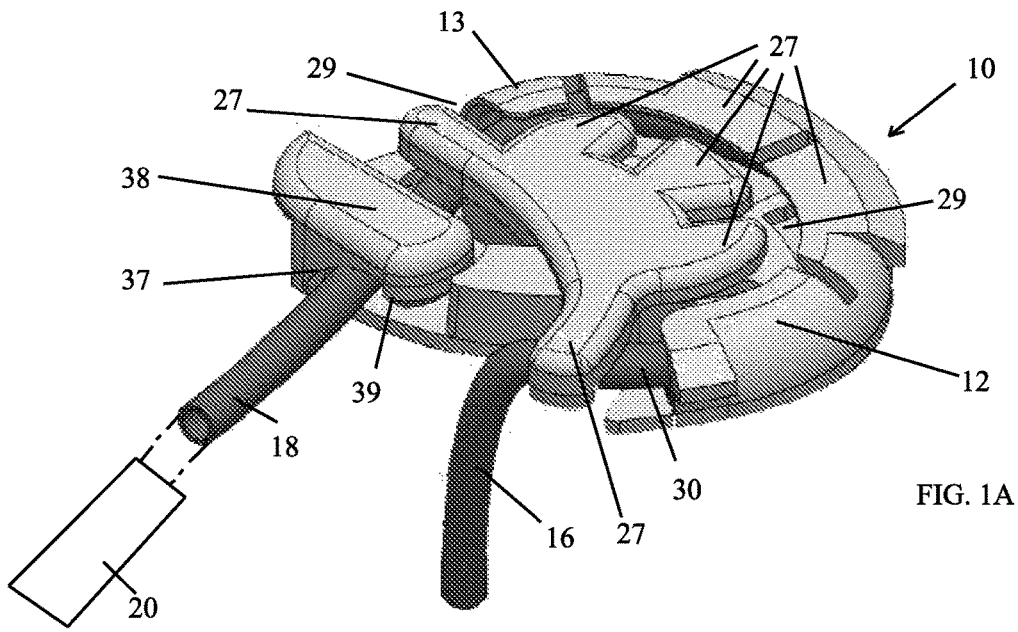
FIGS. 1A and 1B are simplified perspective and bottom-view illustrations, respectively, of a catheter fixation device, constructed and operative in accordance with a non-limiting embodiment of the present invention, in which a proximal end of the catheter is not pulled proximally.
Figure 1B:
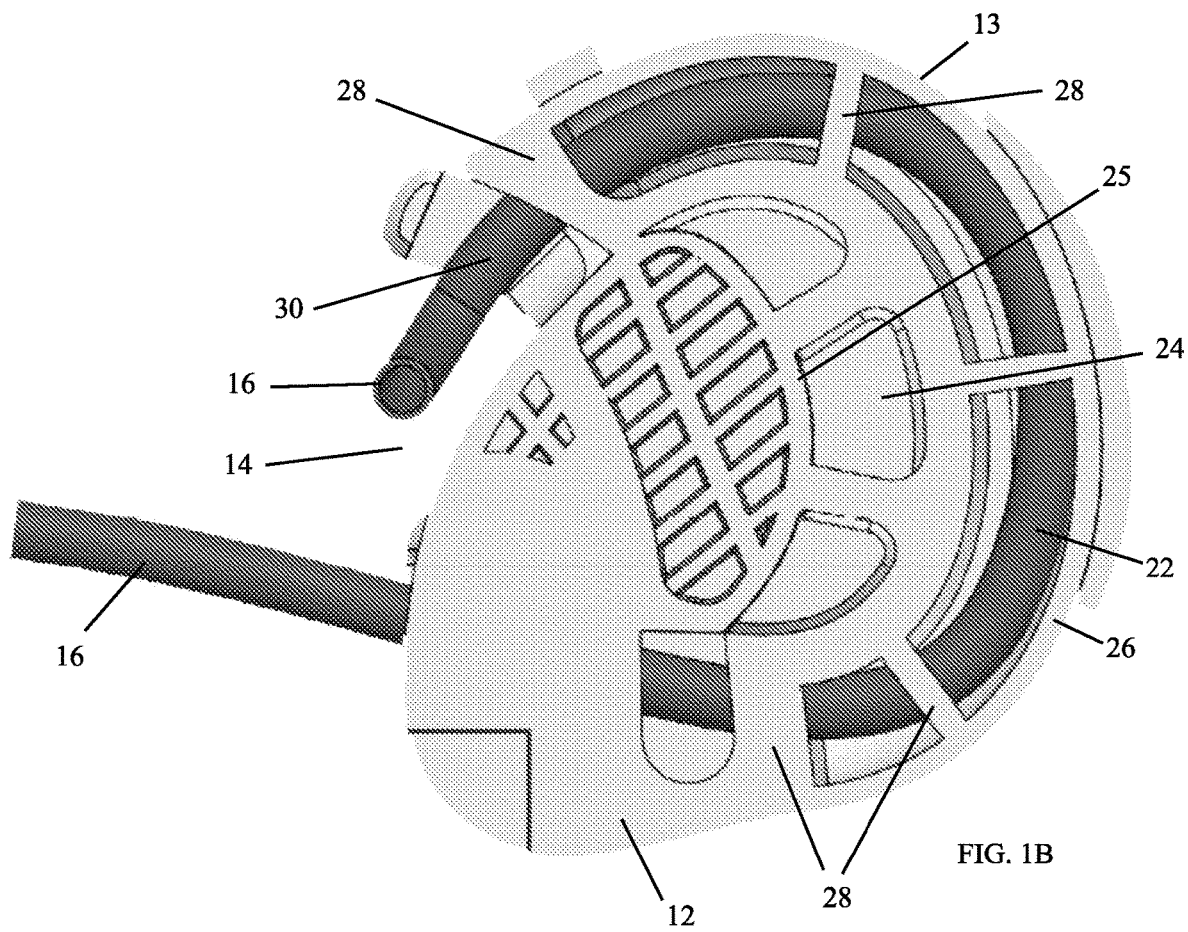
Figure 2A:
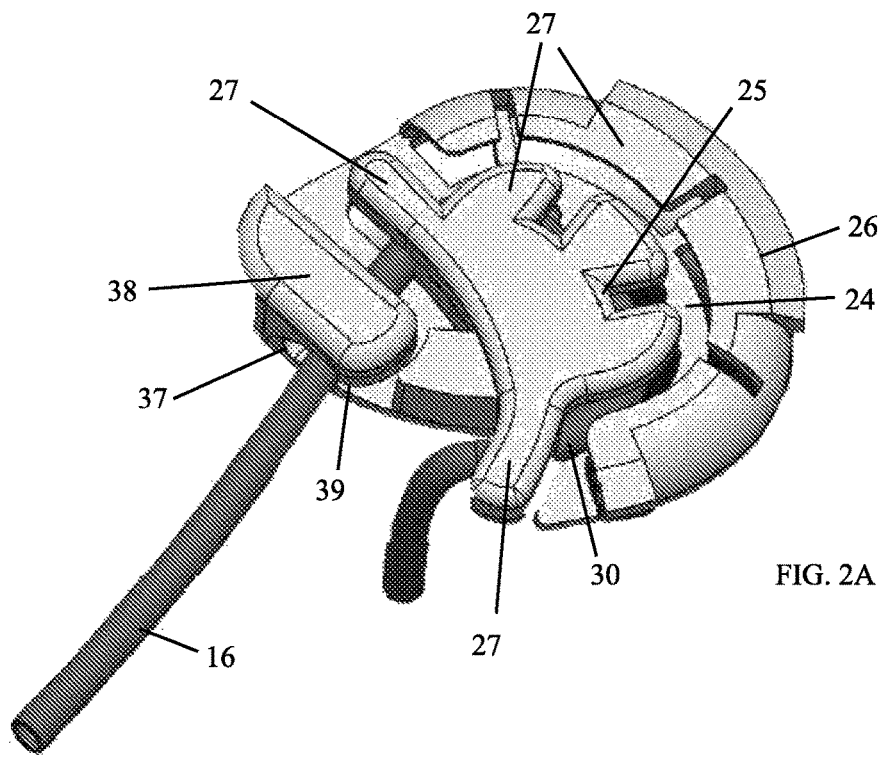
FIGS. 2A and 2B are simplified perspective and bottom-view illustrations, respectively, of the catheter fixation device of FIGS. 1A and 1B with the proximal end of the catheter pulled proximally and yet the distal portion of the catheter remains properly fixed to the patient, does not kink and does not pull out of the patient.
Figure 2B:
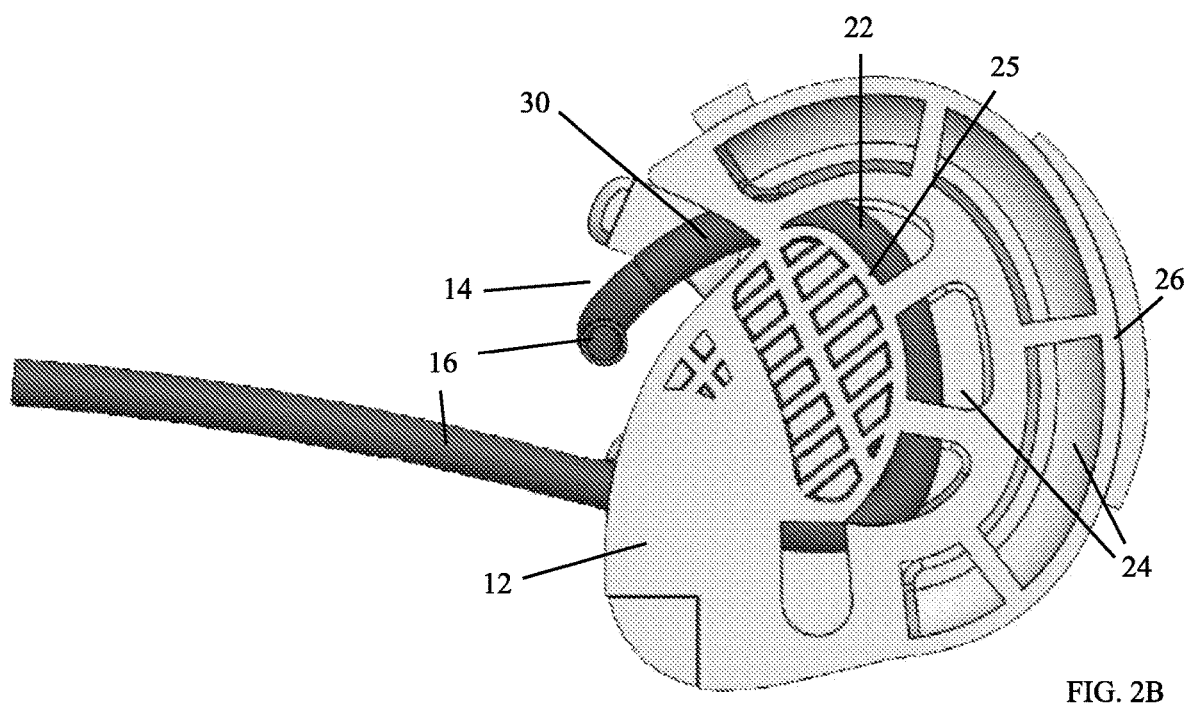
Figure 3:
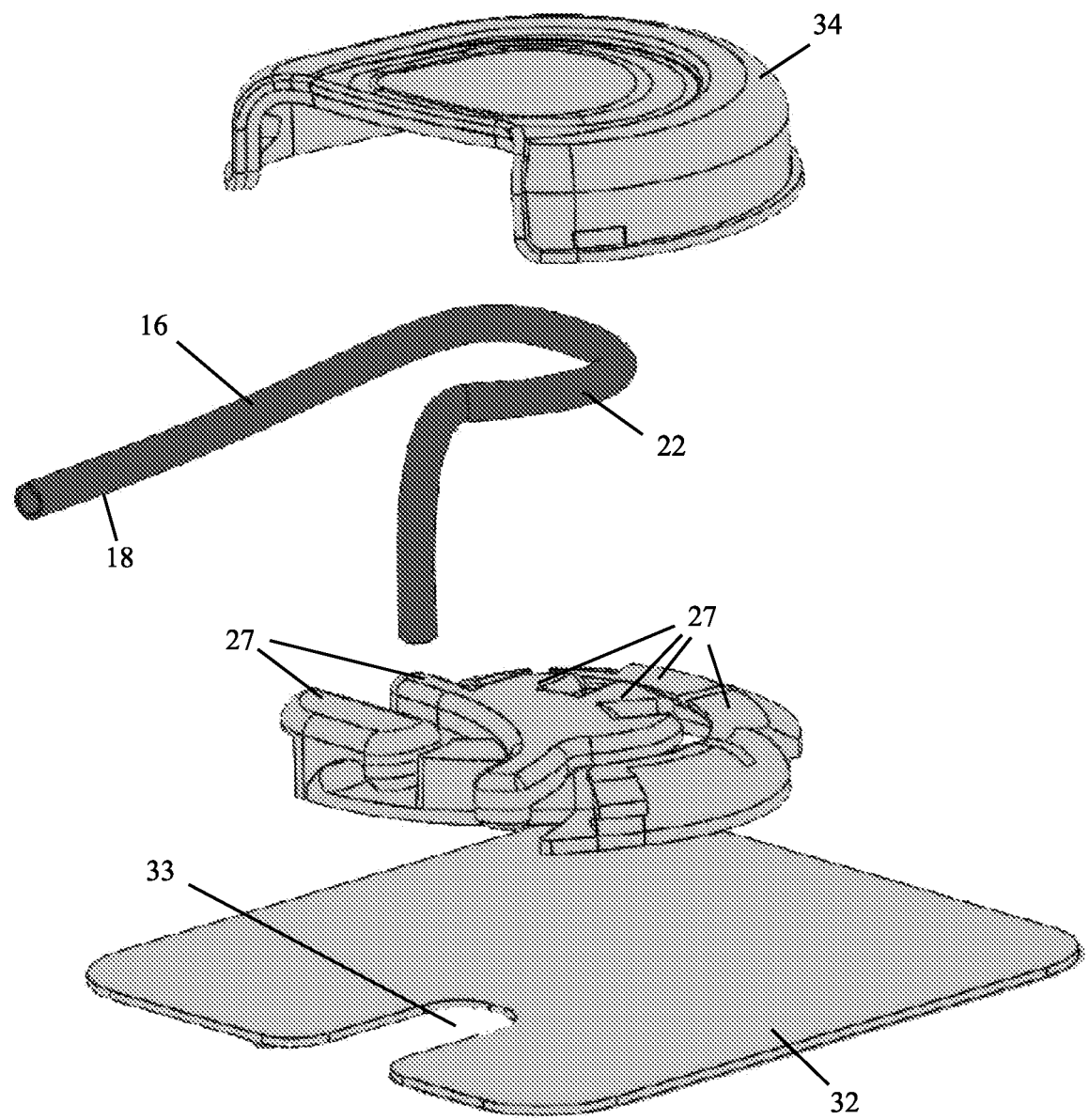
FIG. 3 is an exploded pictorial illustration of the catheter fixation device.

Reference is now made to FIGS. 1A-3, which illustrate a catheter fixation device 10, constructed and operative in accordance with a non-limiting embodiment of the present invention.

The catheter fixation device 10 includes a main body 12, which may be, but not necessarily, circular or elliptical with a rounded peripheral rim 13 (FIGS. 1 and 2). Body 12 (and rim 13) may be formed with one or more gaps 29 that enable positioning catheter 16 in device 10 after catheter 16 has been placed in the patient. Gaps 29 also enable replacing device 10 without moving catheter 16.

A catheter 16 passes through an open area 14, which, without limitation, may be positioned off-center of the floor of the main body as seen in the illustrated embodiment (but may be positioned at other places in the main body). The catheter 16 has a proximal end 18 which may be coupled to a fluid component 20, such as but not limited to, a luer lock, pinch lock and others. Catheter 16 includes a coiled portion 22 that fits into the inner volume of main body 12. Coiled portion 22 may include one or more windings. The distal end of catheter 16 may include, without limitation, a needle or sharp end (but alternatively could be non-sharp).

The catheter fixation device 10 includes an anti-pull-out lock mechanism and enables controllable catheter maneuverability. Without limitation, the anti-pull-out lock mechanism includes an arcuate channel 24 bounded by a pair of arcuate walls 25 and 26 which extend (e.g., perpendicularly) from the floor of main body 12. The coiled portion 22 of catheter 16 is constrained to move between arcuate walls 25 and 26 during movement of the proximal end 18 of catheter 16 and the distal portion of the catheter remains substantially in place. When not pulled in the proximal direction (FIGS. 1A and 1B), the coiled portion 22 can abut against the far wall 26; when pulled in the proximal direction (FIGS. 2A and 2B), the coiled portion 22 can abut against the near wall 25.

The anti-pull-out lock mechanism may also include one or more roof members 27 (FIG. 1A) that prevent (upward) vertical pull-out of catheter 16 ("vertical" with respect to the floor of the device). The roof members 27 may extend perpendicularly from any portion of arcuate walls 25 or 26. For example, in the illustrated embodiment, some roof members 27 extend arcuately inwards of far wall 26, while other roof members 27 overlie near wall 25 at several discrete positions. The anti-pull-out lock mechanism may also include one or more lower members 28 (FIG. 1B) that prevent (downward) vertical pull-out of catheter 16. The lower members 28 facilitate the connection (coupling or bonding) of the main body 12 to the adhesive pad 32 and/or to the patient's skin.

The catheter fixation device further includes, without limitation, an anti-kink guard mechanism, such as but not limited to, a passage bounded by a side wall 37, an upper member 38, and a lip member 39 perpendicular to the floor of main body 12 and opposite side wall 37. Another anti-kink guard mechanism may include a strain-relief (safety relief) member 30 located at an exit of the catheter 16 from the main body 12.

The catheter fixation device keeps the catheter 16 safely in place in the skin of the patient, while permitting proximal and distal movement of the rest of the catheter (the proximal part of the catheter).

The catheter fixation device 10 may be made of injection-molded plastic or any medically safe material, with different hardness and flexibility, as required.

The device 10 may be attached to the skin of the patient with an adhesive pad 32 (FIG. 3) on a bottom surface of main body 12, which is simple to apply and assemble. Pad 32 may have an aperture 33 for the catheter 16 to pass through. The device 10 may have a cover 34 (FIG. 3), which enables easy monitoring, cleaning and maintenance of the device. Cover 34 may block view of the catheter so that it is more pleasant for most users or can be transparent to enable monitoring the catheter position and hygiene. Cover 34 also helps keep catheter 16 in place so it does not pull out.

What is claimed is:

1. A catheter fixation device comprising:
a body;
a catheter having a proximal portion and a distal portion that passes through an opening in said body; and
an anti-pull-out lock mechanism comprising an arcuate channel bounded by a pair of arcuate walls extending from a floor of said body, wherein a coiled portion of said catheter is constrained to move between said arcuate walls during movement of said proximal portion and said distal portion remains substantially in place, and wherein said opening is formed through a planar surface of said floor and is positioned off-center from a geometric center of said planar surface of said floor, and said anti-pull-out lock mechanism comprises roof members that prevent vertical pull-out of said catheter with respect to said floor, wherein one of said roof members is a central roof member that overlies a center of said body and which has first and second extensions that extend radially outwards from said center, said first extension overlying said proximal portion of said catheter and said second extension overlying said distal portion of said catheter, and wherein said catheter curves around said center of said body underneath said central roof member.

2. The catheter fixation device according to claim 1, wherein said body is formed with one or more gaps through which said catheter is placed in said catheter fixation device.

3. The catheter fixation device according to claim 1, wherein when said proximal portion is not pulled proximally, said coiled portion can abut against one of said arcuate walls and when said proximal portion is pulled proximally, said coiled portion can abut against another of said arcuate walls.

4. The catheter fixation device according to claim 1, wherein some-of said roof members comprise outer roof members separate by radial gaps from said central roof member at several discrete positions.

5. The catheter fixation device according to claim 1, wherein said anti-pull-out lock mechanism comprises one or more lower members that prevent pull-out of said catheter.

6. The catheter fixation device according to claim 5, wherein said one or more lower members are configured to couple said body to an adhesive pad or to a patient's skin.

7. The catheter fixation device according to claim 1, further comprising an anti-kink guard mechanism comprising a passage bounded by a side wall, an upper member, and a lip member opposite said side wall.

8. The catheter fixation device according to claim 1, further comprising an adhesive pad on a bottom surface of said body.

9. The catheter fixation device according to claim 1, further comprising a cover on said body.

10. The catheter fixation device according to claim 1, wherein a strain-relief member is located at an exit of said catheter from said body.

\* \* \* \* \*